(No Model.)
T. H. BRIGG.
DRAFT ATTACHMENT FOR VEHICLES.
No. 439,468. Patented Oct. 28, 1890.
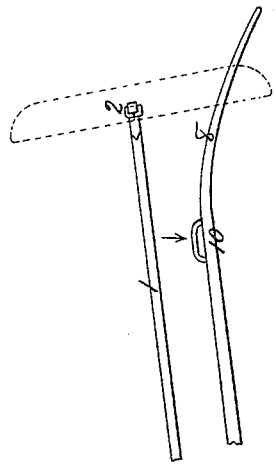
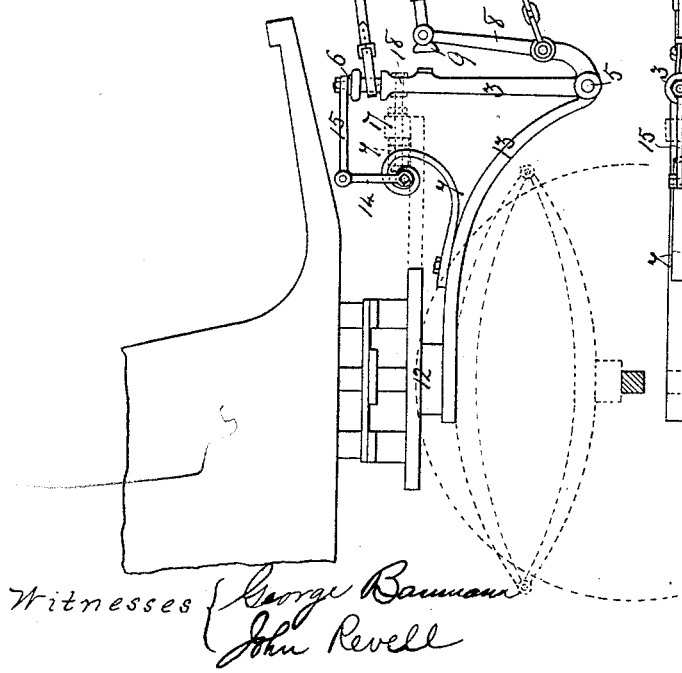
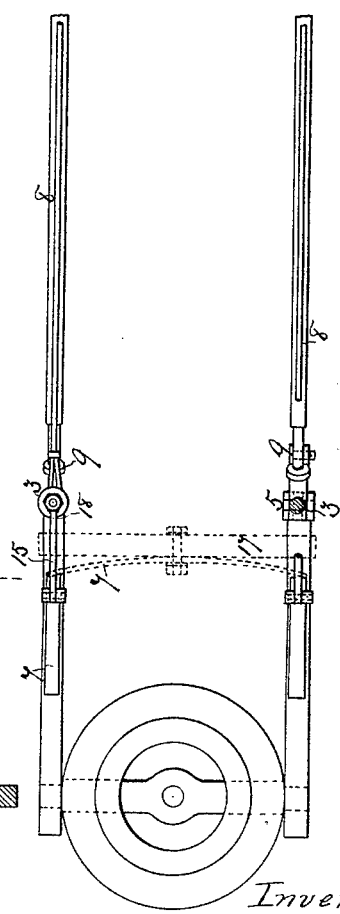
Witnesses
George Bauman
John Revell
Inventor:
Thomas H. Brigg
By his Attorneys
Howson and Howson

UNITED STATES PATENT OFFICE.

THOMAS HARGREAVES BRIGG, OF BARNES, ENGLAND.

DRAFT ATTACHMENT FOR VEHICLES.

SPECIFICATION forming part of Letters Patent No. 439,468, dated October 28, 1890.

Application filed January 7, 1890. Serial No. 336,157. (No model.) Patented in England June 6, 1889, No. 9,411.

*To all whom it may concern:*

Be it known that I, THOMAS HARGREAVES BRIGG, a subject of the Queen of Great Britain and Ireland, residing at Barnes, in the county of Surrey, England, have invented a certain Improved Draft Attachment for Vehicles, (for which I have obtained British Patent No. 9,411, dated June 6, 1889,) of which the following is a specification.

This invention relates to an improved system and means of connecting draft-animals to two-axled wheeled vehicles, agricultural implements, and other ground vehicles and implements having fore and aft wheel or other bearings upon the ground, whereby the animal will be enabled to effect the draft with the minimum expenditure of energy.

With the ordinary means of connecting draft-animals to such vehicles and implements the animal's tractive energy, especially when in heavy draft, is materially diminished by the tendency of the traces to rotate the animal on its hind feet, thereby robbing it of weight at the forequarters and of the tractive power thereof, as the animal will at such times vainly endeavor to get an effective foothold and throwing an unnatural proportion of its weight and all added weight due to the inclination of the traces upon its hind legs, whereby the animal is quickly tired and its energy is wasted.

With my improved draft attachment the animal when traveling on comparatively level ground or in normal draft is caused to exert its tractive efforts through the traces in a normal manner; but upon the occurrence of any increase of gradient or of any other occasion or increase of resistance (whether temporary or prolonged) when the animal is in heavy or abnormal draft its increased tractive efforts exerted through the traces are caused to be automatically operative through the instrumentality of the shafts or the pole in bringing a downwardly-exerted pressure (in proportion to the increased resistance) to bear upon its forequarters, whereby the tilting tendency of the traces is counterbalanced and the animal's weight is kept naturally distributed upon its four legs and the work is kept equally distributed thereupon.

The improved attachment consists of a trace lever or levers, a rigid shaft or pole lever or levers, and a spring or springs so arranged that the springs prevent the trace-levers from acting upon the shaft-levers while the vehicle is in normal draft, but allow of their acting thereupon in such a manner as to cause them to be operative in the manner aforesaid upon the occurrence of any abnormal resistance of the vehicle and upon their resistance being overcome by the increased tractive efforts of the animal.

In the accompanying drawings, Figure 1 represents a side elevation of the fore part of a two-axled wheeled vehicle with the improved attachment applied thereto. Fig. 2 represents a plan view of the fore carriage of the vehicle and the said attachment.

3 represents the trace-levers, which are pivoted at 5 to an extension 13, projecting from the fore carriage 12, or the levers may be otherwise suitably supported thereby. The traces 1 are connected to such levers and to the hame at 2.

8 represents the shaft or pole levers, which also are pivoted to the extension from the fore carriage, or may be otherwise suitably supported thereby, and may be made of a rigid formation, or in parts jointed at 9 and tied by a connection 16.

7 represents the trace-lever-controlling springs, which also are supported by the extension from the fore carriage, or may be otherwise suitably supported thereby. These springs are connected to the trace-levers by radial rods 14 and links 15, or in any other suitable manner, and are of sufficient strength to keep the latter in their normal position of inoperation upon the shaft-levers so long as the vehicle is in normal draft; but upon the occasion of any abnormal resistance of the vehicle the resistance of such springs is overcome by the increased tractive efforts of the connected animal, and the trace-levers are drawn against the points 9 of the shaft-levers, causing the latter to turn about their pivoted connections 5 and to bear downwardly upon the forequarters of the animal through their connection thereto at 10 (or where elsewhere connected at the forequarters) with a force proportionate to the pull through the traces, and which is effective in neutralizing the increased tendency of the traces to raise the forequarters of the animal by tilting it upon its hind feet and in attaining the aforesaid object. The shaft-levers may be so proportioned that the downward pressure to be exerted by them will be in exact proportion to the resistance of the load and to the animal's tractive efforts, or that such pressure will be proportionately increased to correspond with the increase of weight on the hind legs due to the resolution of such tractive and downward forces.

In the accompanying drawings the fulcrums 5 of the levers 3 8 are represented as coincident and as supported by the same scrolls 13 (projecting from the fore carriage 12) as support the springs 7, which in full lines are represented as of a coiled formation, and the shaft-levers 8 are jointed at 9, their arms being tied by the connections 16, which prevent such levers from rotating upwardly on such joints; but I wish it to be understood that the formation and arrangement of the trace levers or lever, the trace-lever-controlling springs or spring, and the shaft levers or lever, which constitute the essential parts of the improved draft attachment, may require to be modified in accordance with the nature and construction of the vehicle or implement to which the attachment is to be applied. As an example, the dotted lines 7 represent a spring of a flat form applied behind a splinter-bar 17 and as connected to and controlling the levers 3 by means of bolts 18. The improved attachment is also of advantage in materially assisting the animal in starting the vehicle, which requires a greater expenditure of energy than the subsequent keeping of the vehicle going requires, and the advantage of being automatic in its aforesaid action upon the animal, and in reducing the said downward pressure simultaneously with and in exact ratio to the reduced tension of the traces when the vehicle is starting or is in the act of surmounting any obstacle.

I claim as my invention—

1. The system of connecting draft-animals to vehicles and ground implements with spring-controlled trace-levers and shaft or pole levers supported by the vehicle or implement and combined, substantially as described, whereby any excess of pull through the traces beyond the resistance of the trace-lever springs is caused to be operated through the shaft or pole levers in bringing a downward pressure upon the animal's forequarters, whereby the tilting tendency of the traces is counterbalanced, as set forth.

2. In a draft attachment for such vehicles and implements, in combination, a lever or levers 3, connected to the animal by the traces, a rigid shaft or pole lever or pole-levers 8, connected to the animal at the forequarters, and a spring or springs 7, withholding the trace-levers from operating upon the shaft-levers when the vehicle is in normal draft, the said trace-levers, shaft-levers, and springs being supported by the fore part of the vehicle and so arranged that upon any abnormal resistance of the vehicle when the resistance of the trace-lever-controlling springs is overcome the excess of pull exerted through the traces is caused to be effective through the shaft-levers in bringing a downward pressure upon the animal's forequarters, whereby the tilting tendency of the traces is counterbalanced, as set forth.

In testimony whereof I have signed my name to this specification in the presence of two subscribing witnesses.

THOMAS HARGREAVES BRIGG.

Witnesses:
   CHARLES AUBREY DAVY, F. I. P. A.,
   ROBERT EDWARD RICE,
*Both of* 321 *High Holborn, London, England.*